March 31, 1964 D. M. COULTER 3,127,475

SYNCHRONIZATION OF PULSE COMMUNICATION SYSTEMS

Filed July 9, 1962 3 Sheets-Sheet 1

INVENTOR
D. M. COULTER
BY John K. Mullarney
ATTORNEY

INVENTOR
D. M. COULTER
BY John K. Mullarney
ATTORNEY

INVENTOR
D. M. COULTER
BY John K. Mullarney
ATTORNEY

United States Patent Office 3,127,475

Patented Mar. 31, 1964

3,127,475

SYNCHRONIZATION OF PULSE COMMUNICATION SYSTEMS

Donald M. Coulter, Hanover Township, Morris County, N.J., assignor to Bell Telephone Laboratories, Incorporated, New York, N.Y., a corporation of New York Filed July 9, 1962, Ser. No. 208,647
8 Claims. (Cl. 179—15)

Figure 1:
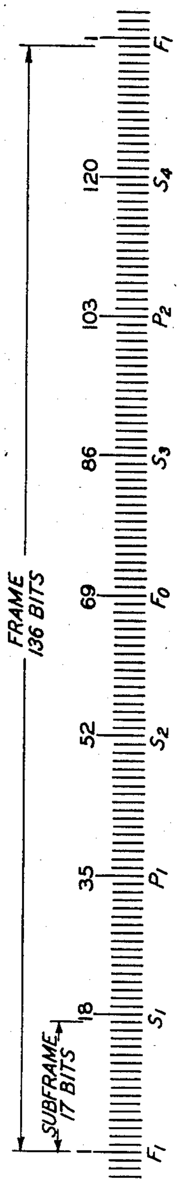

This invention relates to communication by pulse techniques and particularly to the synchronization of receiver apparatus with transmitter apparatus.

Although the present invention is applicable to pulse communication systems in general, it will be described herein in connection with pulse code multiplex systems.

A pulse code transmission system is one in which instantaneous amplitude values or "samples" of a message, for example the voice wave of a telephone conversation originating at a transmitter station, are translated into code pulse groups, transmitted in that form to a receiver station, and there decoded or translated into the original message form for delivery to the listener. Such systems have certain known advantages as compared with more conventional systems, among which are their remarkable freedom from interference and their easy adaptability to multiplexing by time division. However, for correct reconstitution of a message and, in the case of a time division multiplex system for correct distribution of the several messages among the several listeners, the receiver apparatus must operate in substantially perfect synchronism with the transmitter apparatus; i.e., it must operate not only at the same frequency or speed, but it must also maintain a given phase relation to a very precise degree. To this end it is known to transmit, in addition to the message and supervisory information, certain synchronizing information, for example in the form of marker pulses recurring in a preassigned sequence, which hold the receiver apparatus in step with the transmitter apparatus at the correct frequency and in the correct phase or angular alignment. It is also a most desirable feature that the receiver apparatus shall rapidly return to correct alignment with the transmitter apparatus, after a momentary interruption in service or any other occurrence that results in a temporary "out-of-frame" condition. Because the encoded samples or data are transmitted in frames, receiver synchronizing is often referred to as "framing" or "phasing" and the recovery of frame or phase alignment, once lost, is termed "reframing."

The object in framing and reframing is to adjust the receive-station clock pulse distributor so that when it generates a clock pulse ($F_1$), the framing bit ($F_1$) in the received bit stream will be on the output bus of the receiver apparatus. If this can be done, all other bits in the received bit stream will be oriented properly with respect to local clock pulses, and they can be identified and correctly routed.

It has been the usual practice heretofore (e.g., see Patent No. 2,527,638) to restore framing, once it is lost, by intermittently blocking a driving pulse to the clock pulse distributor, thus allowing the receiver phase to be retarded step by step until framing is re-established. The difficulty with this framing method lies in the way the search for frame is conducted. When framing is lost, the search begins with the frame position last known to have been the $F_1$ bit position and proceeds bit by bit in order from that position, in one direction. Now if it happens that the frame bit $F_1$ has shifted in the direction in which the search is proceeding, framing is quickly regained. If, however, it happens that the frame bit has shifted frame position in the other direction, the search will have to cover very nearly the whole frame before framing is re-established, and the process will require a substantial period of time.

It is the primary object of the present invention to accelerate the re-establishment of synchronous operation of a pulse communication receiver with its transmitter after it has once been lost.

This object is attained in accordance with the invention by so controlling the frame search that it includes frame positions on both sides of the last known frame bit position. In brief, the technique advantageously utilized herein consists of starting the frame search $n$ frame positions ahead of or in advance of the last known frame bit position and then permitting the frame search to proceed as heretofore, the local clock phase being retarded by one bit period each time the frame search fails. The search will approach and possibly go through the old frame bit position, yet if $n$ is properly chosen there is a very high probability the frame bit $F_1$ will be recovered in $2n$ or fewer bits.

The number $n$ may be arrived at empirically or statistically; but however arrived at, it should be large enough so that there is a high probability that the frame bit $F_1$ will be found in the $2n$ interval, which will of course be searched first. Available data indicates that on high frequency radio links, for example, transmission path length variations will be of the order of four milliseconds or less. With a typical transmission rate of 2.55 kb./sec. (kb.=kilobits), the expectable variation in frame bit position will thus be approximately ten bit positions or less (plus or minus five bits). Accordingly, if $n$ is chosen to be five, there will be a very high probability of frame recovery in the $2n$ interval.

Figure 5:
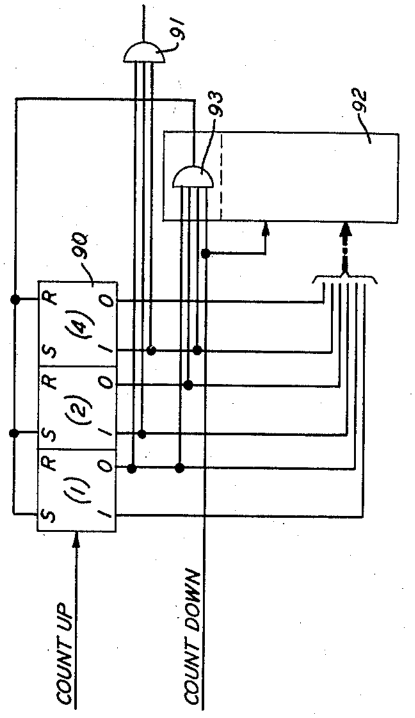
Figures 2, 4:
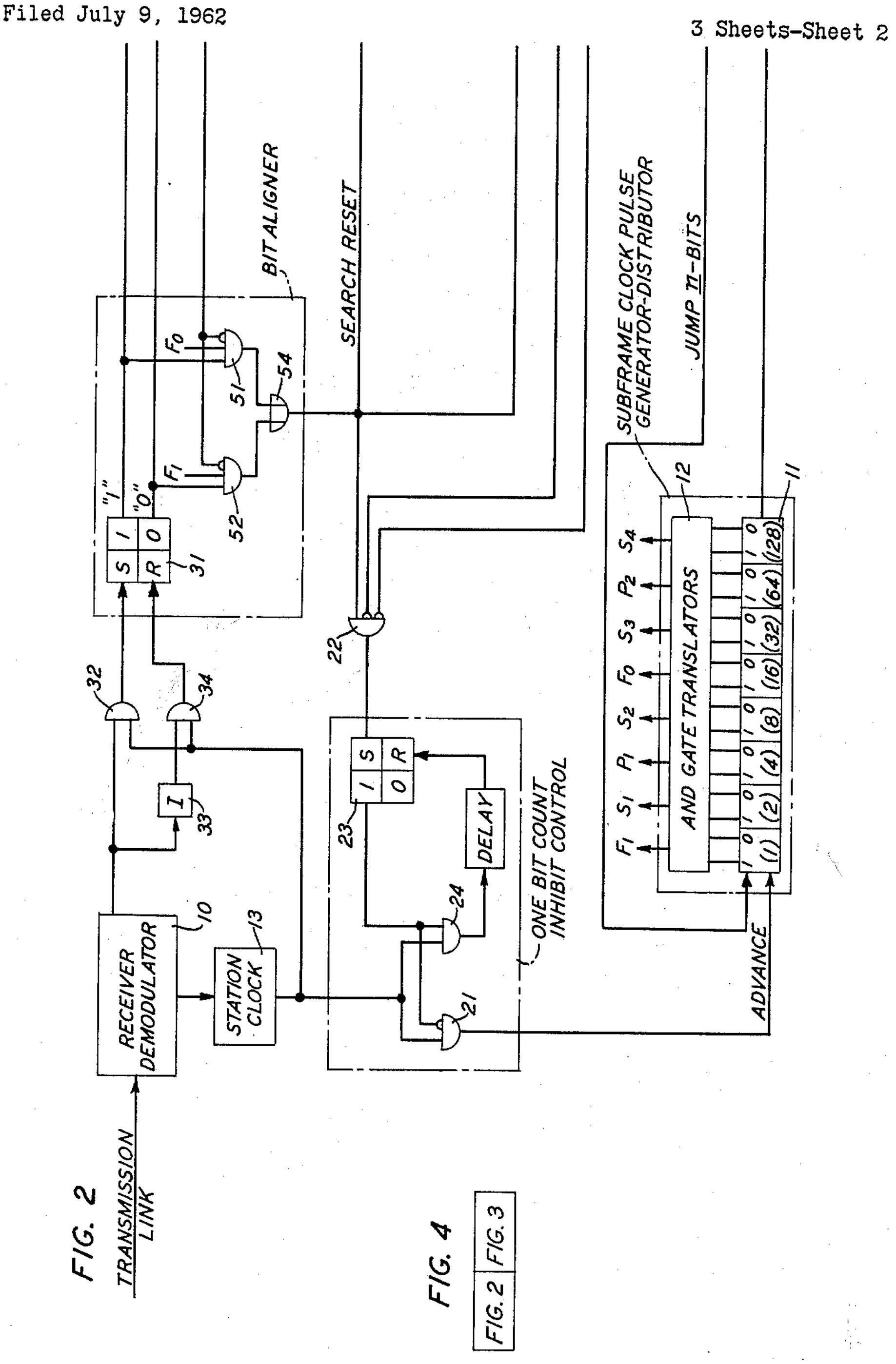
Figure 3:
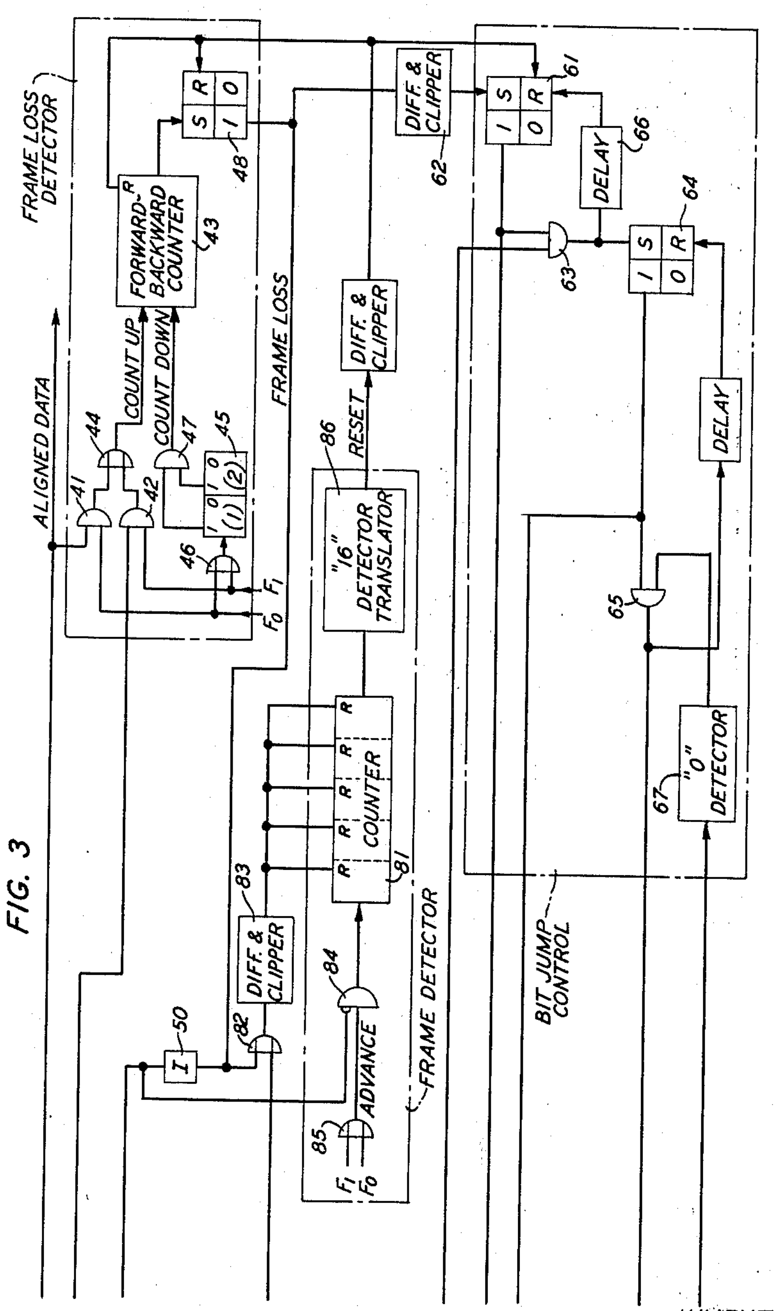

The invention will be more fully apprehended from the following detailed description when considered in connection with the accompanying drawings in which:

FIG. 1 illustrates a typical message bit stream that is received over a transmission link in a cyclic pattern;

FIGS. 2 and 3, when arranged as shown in FIG. 4, show a schematic block diagram of an automatic frame alignment system constructed in accordance with the principles of the present invention; and FIG. 5 is a detailed schematic diagram of the forward-backward counter shown in FIG. 3.

Referring now to the drawings, FIG. 1 shows the format of a typical digital message stream that is received over a transmission link in a cyclic pattern. In the illustrated case, a cycle of 136 bits, or a frame, contains 128 message bits; 4 supervisory bits, $S_1$, $S_2$, $S_3$ and $S_4$; and 4 control bits, $F_1$, $F_0$, $P_1$ and $P_2$. The eight supervisory and control bits are called subframe bits; they are distributed evenly throughout the bit stream, any two adjacent subframe bits being separated by sixteen message bits. The $P_1$ and $P_2$ bits are parity bits; the $F_1$ and $F_0$ bits are framing bits.

In the illustrated example, the $F_1$ bit is always a binary one and the $F_0$ is always a binary zero, these two assignments being made at the transmitting facility. The message, parity and supervisory bits will be one or zero in some more-or-less random fashion, depending on the message being transmitted. It is apparent, therefore, that the $F_1$ and $F_0$ bits always appear as a 1010101 . . . pattern, and that no other pair of bits separated by a half frame will have such a continuous repetitive pattern. It is this constant and unique 10101 . . . sequence in the bit stream that makes framing possible.

The basic objective in framing is to locate the $F_1$ bit position. In the instant case, the $F_0$ bit itself is not significant, but it does speed up the reframing process since it increases the rate of information on which a framing decision is based. However, as will be more apparent hereinafter, the invention is in no way dependent on the utilization of this $F_0$ bit, nor is it limited to any specific type of unique framing pulse pattern. Similarly, the utility of the instant invention is completely independent of frame rate, frame length, bits per frame or subframe, and the like. All that is necessary in carrying out the principles of the invention is that a recognizable framing bit pattern be inserted in the digital message stream at the transmitter.

An automatic reframer in accordance with the invention is shown in FIGS. 2 and 3, and, similar to other reframers, it comprises a local clock subsystem which generates and distributes clock signals known collectively as the subframe clock signals and individually as the $F_1$ clock, $S_1$ clock, $P_1$ clock, and so on, for all eight subframe clock signals. This local clock unit comprises a counter 11 and associated, conventional, AND gate, translator stages 12. It is advanced by a signal from the station logic clock 13, the latter being "slaved" to the line transmission rate. For present purposes, it is sufficient to say that the local clock unit will generate the subframe clock signals, phased with respect to each other, as shown in FIG. 1, and each one occurring once each frame. Furthermore, as will be described hereinafter, the clock unit can be controlled so that the phase of the subframe signal set can be changed with respect to the bit stream while maintaining the phases of the eight individual clock signals with respect to each other.

As indicated hereinbefore, the objective in reframing is to adjust the local clock unit so that when it generates the $F_1$ clock pulse, the $F_1$ bit in the message bit stream will be on the receiver bus, designated "Aligned Data" in FIG. 3. If this is done, all other bits in the message bit stream will be oriented or phased properly with respect to the local clock signals, and they can thus be identified and routed.

To aid the reader in understanding the invention, the reframer and the major functional components thereof will first be described in general terms, and this will then be followed by a detailed circuit description. The station logic clock 13 is slaved to, and hence runs at, the digital transmission rate. When the receiver apparatus is in-frame the clock pulses from clock 13 are delivered to counter 11 via the "One Bit Count Inhibit Control." The counter 11 thereby counts and resets cyclically and in synchronism with the incoming frames. However, when an out-of-frame condition exists, these clock pulses are intermittently blocked or inhibited, thus allowing the phase of the counter 11 to be retarded, in a step-like fashion.

After demodulation, in the receiver-demodulator 10, the message bit stream is delivered to the "Bit Aligner" and after storage in a one-bit storage means of the latter appears on the output bus, designated Aligned Data, as a "full-bauded" or "non-return to zero" type message. As is known to those in the art, a full-bauded or "NRZ" message stream is simply one wherein the interface or leading and trailing edges between similar, adjacent bits are eliminated (i.e., they are non-existent). This conversion, of course, results in no loss of information.

As the name implies, and as will be described hereinafter, the Bit Aligner compares the timing or alignment of the locally generated $F_1$ and $F_0$ clock signals with the $F_1$ and $F_0$ bits in the received bit stream. When the receiver apparatus is in frame the Bit Aligner is inhibited.

When an out-of-frame condition occurs, the "Frame Loss Detector" generates a "frame loss" signal which removes the inhibit from the Bit Aligner causing the same to start the frame search process. For the present, assume the "Bit Jump Control" unit is non-existent. When the Bit Aligner begins the frame search, it monitors the received bit stream by strobing the same with the $F_1$ and $F_0$ clock signals. Recalling now that the $F_1$ bit in the message stream is always a one, the $F_0$ bit is always a zero, and the other bits vary continuously in some more-or-less random fashion, a "search reset" signal will be intermittently and randomly generated as long as the out-of-frame condition exists. Each search reset signal is applied to the One Bit Count Inhibit Control causing the same to inhibit the delivery of an advance clock pulse signal to the counter 11 for one count. This one count inhibit causes the phase of the subframe clock signals to be retarded with respect to the message bit stream by one bit period. The Bit Aligner now samples the bit stream with the new phase of the locally generated $F_1$ and $F_0$ clock signals. If the frame search fails again, the process is repeated; each time the search fails the local clock unit phase is retarded one bit period, until eventually the proper clock phase is found.

A counter in the "Frame Detector" attempts to count to a given predetermined number (e.g., sixteen) in response to applied $F_1$ and $F_0$ clock signals. However, if an out-of-frame condition exists, the intermittently generated search reset signals from the Bit Aligner will continuously reset the counter, thereby preventing it from reaching the predetermined count. When the proper clock phase is eventually found, no further search reset signals will be generated and the counter of the Frame Detector then counts to the chosen number, this being indicative of a continuing in-frame condition. With the return of frame, the Frame Loss Detector is reset by a signal from the Frame Detector, an inhibit signal is once again delivered to the Bit Aligner, and normal service is again resumed.

Turning now to the Bit Jump Control, the aforementioned frame loss signal from the Frame Loss Detector is delivered to said Bit Jump Control, as is the search reset signal heretofore described. These two signals are, of course, indicative of loss of frame. With the receipt of these indications of frame loss, the Bit Jump Control functions to temporarily alter the recycling of the counter 11. That is, for the cycle next following that in which frame loss is realized, the counter, rather than being reset to zero, is reset to state N, the effect of which is to advance the counter phase with respect to the bit stream by $n$ bit positions. Thus, if the $F_1$ clock signal is normally generated each time the counter 11 reaches count one, then the advance of $n=5$ bit positions is accomplished by immediately setting the counter 11 to state $N=6$.

The Bit Jump Control contains logic circuitry to reset the same after it delivers the "jump $n$-bits" signal to the counter 11. Thus, the frame search thereafter proceeds as heretofore described, the counter phase being retarded by one bit period each time the frame search fails.

Considering the automatic reframer now in greater detail, the message bit stream received over the transmission link is demodulated in the receiver-demodulator unit 10. The station clock 13 is slaved to run synchronously at the received transmission rate using techniques well known in the art. When the receiver apparatus is in-frame the clock pulses from clock 13 are delivered to the counter 11 via the AND gate 21 of the One Bit Count Inhibit Control. As will be described hereinafter, for an out-of-frame condition, an inhibit signal is intermittently applied to AND gate 21 to intermittently block these clock pulses.

The clock pulses from clock 13 advance the count in binary counter 11 in a typical step-like manner. The counter thereby normally counts and resets cyclically and in synchronism with the incoming frames. It is necessary that the counter have a count capacity at least equal to the number of bit positions in a message frame. To this end, the binary counter 11 comprises eight stages, each of which is designated with a designation in parenthesis indicating the decimal equivalent of the binary stage. For the illustrated message bit stream, an eight stage counter, of course, has excess count capacity; however, it is well known in the art to reset a counter to its zero state after it has reached a preselected count; see Chapter 11 of "Pulse and Digital Circuits," by Millman and Taub, McGraw-Hill Publishing Co. (1956).

Each of the eight stages of binary counter 11 is arranged in the manner known in the art to supply "two rail logic output signals." In other words, each stage of counter 11 has a (0) and a (1) output lead. These leads extend to form, along with a plurality of AND gates, a typical translation circuit, which is designated by numeral 12 in the drawings. For example, to generate the $F_1$ clock pulse each time the counter 11 reaches count one, an AND gate is connected at its input to the (1) output lead of stage (1) and to the (0) output leads of the remaining stages. Thus, clock pulse $F_1$ will be generated once, and only once, per counter cycle. In like manner, another AND gate is connected to appropriate rail leads so as to generate the $S_1$ clock pulse when the counter reaches count 18; and so on, for the other clock pulse signals.

The message bit stream is fed to the flip-flop 31 of the Bit Aligner via a "double rail gating" logic circuit. The operation of this logic circuit is such that a binary one in the message stream sets the flip-flop 31 to its "1" state, and a binary zero sets the flip-flop to its "0" state. For example, a binary one in the input bit stream will be applied to the input of AND gate 32 along with a clock pulse from station clock 13, whereby an energizing signal will be delivered to the set terminal of flip-flop 31 to set the same in its "1" state. If flip-flop 31 was already in the "1" state, it just remains there. Since the bit stream is inverted in inverter 33, the AND gate 34 remains deenergized at this time.

A binary zero in the message bit stream fails, of course, to energize AND gate 32; but because of the voltage inversion provided by inverter 33, this binary zero causes an energizing signal to be delivered from AND gate 34 to the reset terminal of flip-flop 31 to set the same to its "0" state.

In the described manner, the flip-flop 31 is continuously set and reset in accordance with the bit sequence in the message bit stream. The discrete pulse message bit stream is thereby converted to a non-return to zero (NRZ) type message stream, but this conversion results in no loss of information.

The Frame Loss Detector is connected to the (1) and (0) output leads of the flip-flop 31, and to the $F_1$ and $F_0$ clock pulse leads of the "Subframe Clock Pulse Generator-Distributor." As the name implies, the purpose of this detector unit is to detect a loss of frame condition. The AND gate 41 of the Frame Loss Detector is connected to the (1) output lead of flip-flop 31 and to the aforementioned $F_0$ clock pulse lead. Recalling now that the $F_0$ bit of the message stream is always a zero, the flip-flop 31 should be in its "0" state during the $F_0$ clock pulse period, with the result that AND gate 41 will remain deenergized. If, however, the flip-flop 31 is in fact in its "1" state, indicative of possible loss of frame, the AND gate 41 will be energized to provide an output pulse signal.

The AND gate 42 is connected to the (0) output lead of flip-flop 31 and to the aforementioned $F_1$ clock pulse lead. Since the $F_1$ bit of the message stream is always a one, the flip-flop 31 should be in its "1" state during the $F_1$ clock pulse period. If, however, the flip-flop is in fact in its "0" state, indicative of possible loss of frame, the AND gate 42 will be actuated and produce an energizing output pulse signal. Output signals from AND gates 41 and 42 therefore indicate possible frame loss. The output signals, if any, from gates 41 and 42 are coupled, via OR gate 44, to the forward-backward counter 43 to advance the count of the same.

The $F_1$ and $F_0$ clock signals are also coupled to the input of the two stage binary counter 45 via the OR gate 46. The counter 45 continuously counts to three and resets in response to the applied $F_1$ and $F_0$ clock signals. The AND gate 47 is connected to the (1) output leads of the two stages of counter 45, and thus a "count down" pulse is applied to the forward-backward counter 43 for every fourth input clock pulse applied to counter 45.

The counter 43 counts up and down in response to applied "count up" and "count down" signals. The count up signals occur only for a possible loss of frame condition, whereas a count down signal is generated for every fourth clock signal. The philosophy here is to prevent the initiation of a frame search operation until a true out-of-frame condition exists. Noise bursts, short term signal fade, and the like often give the appearance of an out-of-frame condition, when in fact there has been no actual frame loss. Thus, a short duration noise burst lasting one or two frames, for example, will cause the counter to count up, but upon termination of the same the counter will return to zero count in response to subsequent count down signals. However, for an actual out-of frame condition the count up signals will be applied at a rate that exceeds the count down signal rate, and hence the forward-backward counter 43 quickly counts to a predetermined number (e.g., six).

There are many ways of implementing the above-described count up and count down operation. FIG. 5, which will be described in detail hereinafter, illustrates one manner in which said operation can be carried out.

When the counter 43 reaches the preassigned count, indicative of a true out-of frame condition, an energizing signal is delivered to the flip-flop 48 to set the same to its "1" state. The (1) output lead of this flip-flop is connected, via inverter 50, to the inhibit inputs of inhibited AND gates 51 and 52. The inversion provided by inverter 50 is such that the gates 51 and 52 are inhibited when the flip-flop 48 is in its "0" state, and this inhibit it removed when the latter is set to its "1" state.

The gates 51 and 52 are respectively connected to the (1) and (0) output leads of flip-flop 31 and to the $F_0$ and $F_1$ clock pulse leads in exactly the same manner as the AND gates 41 and 42 of the Frame Loss Detector. Accordingly, these gates likewise function to provide an energizing output signal whenever a possible out-of-frame condition exists, assuming, of course, the inhibit has previously been removed. In operation, a count up pulse signal at the output of OR gate 44 is accompanied by a search reset signal at the output of OR gate 54 if the aforementioned inhibit has previously been removed.

The (1) output lead of flip-flop 48 is also coupled to the set terminal of flip-flop 61, whereby the latter is set to its "1" state when the flip-flop 48 is so set. The differentiator and clipper 62 first differentiates the rectangular wave output of the flip-flop 48 and then clips the negative-going spikes. In this manner the flip-flop 61 is triggered or set only in response to the leading edge of said rectangular wave, and hence it cannot be triggered again until the flop-flop 48 is first reset and then set once again.

The (1) output lead of the flip-flop 61 is connected to one input of AND gate 63 and to an inhibit input of the inhibited AND gate 22. The gate 63 is therefore partially enabled and the gate 22 is inhibited when flip-flop 61 is set to its "1" state. Now if framing should be regained without having to change the phase of the clock pulse set ($F_1$, $S_1$, $P_1$, etc.), the Frame Detector will generate a "reset" signal, in a manner to be described hereinafter, which resets the counter 43 and the flip-flops 48 and 61, and the line is thereby returned to normal service. If framing is not regained with the existing phase of the clock pulse set, the setting of the flip-flops 48 and 61 is accompanied by the intermittent generation of search reset signals by the Bit Aligner, as heretofore described.

With the AND gate 63 partially enabled by the set condition of flip-flop 61, a search reset signal when coupled to the other input of gate 63 enables the same to deliver an energizing signal to the set terminal of flip-flop 64. After a short time delay, this same energizing signal is delivered to the reset terminal of flip-flop 61 to reset the same to its "0" state.

The flip-flop 64 when set to its "1" state partially enables the AND gate 65. The (1) output lead of flip-flop 64 is also connected to a second inhibit input of the inhibited AND gate 22. When flip-flop 61 is reset, it no longer inhibits gate 22, but because of delay 66 the inhibiting signal from flip-flop 64 occurs before the inhibit from flip-flop 61 is removed.

When the counter 11 next recycles and returns to zero count the zero detect unit 67, which is simply an AND gate connected to each of the (0) output rail leads of the counter, enables AND gate 65. The enabled gate 65 generates the signal designated "jump *n*-bits," which when appropriately applied to the counter immediately advances the count of the same. For example, if the $F_1$ clock pulse signal is normally generated each time the counter 11 reaches count one, the energizing signal from AND gate 65 when applied to the set terminals of the second and third counter stages (i.e., stages designated (2) and (4) in the drawing) sets these stages to state "1" and thereby immediately advances the count to six ($n=5$). The counter, of course, can be advanced to any desired state N simply by connecting the output lead of AND gate 65 to the appropriate set terminals of the counter.

After a short time delay, the output signal from AND gate 65 is delivered to the reset terminal of flip-flop 64 to reset the same to its "0" state. With the flip-flops 61 and 64 both returned to the reset condition, the jump *n*-bits signal cannot be generated again, and the search for frame now enters that mode of operation wherein the counter phase is retarded by one bit period each time frame search fails.

With the flip-flops 61 and 64 in the reset state, the gate 22 is no longer inhibited and the intermittent generated search reset signals from the Bit Aligner are thus coupled to the set terminal of the flip-flop 23 of the One Bit Count Inhibit Control. The (1) output lead of flip-flop 23 is connected to AND gate 24 and to the inhibit input of inhibited AND gae 21. Thus, every time a search reset signal is generated by the Bit Aligner, the flip-flop 23 will be set to its "1" state, which in turn will inhibit the transmittal of a clock pulse from clock 13 to counter 11. The phase of the counter will therefore be retarded with respect to the message bit stream by one bit period. The clock pulse that is inhibited in gate 21 serves to enable gate 24 which results in flip-flop 23 being reset after a short time delay.

The Bit Aligner now samples the bit stream with the new phase of the locally generated $F_1$ and $F_0$ clock signals. If the frame search fails again, the flip-flop 23 is again set to its "1" state to thereby inhibit the delivery of another advance clock pulse to the counter 11. Each time the frame search fails the counter phase is retarded one bit period, until eventually the proper clock phase is found.

The inhibit signals applied to gate 22 from the Bit Jump Control insure the desired order of events. That is, the one bit retarding process is not permitted to take place until the jump *n*-bits event has occurred.

The Frame Detector detects when framing has been satisfactorily re-established. The (1) output lead of flip-flop 48 is connected to the reset terminals of the several stages of counter 81 via the OR gate 82 and the differentiator and clipper 83, the latter being the same as the differentiator-clipper 62 and serving essentially the same purpose. The (1) output lead of flip-flop 48 is also connected, via inverter 50, to the inhibit input of inhibited AND gate 84. The inversion provided by inverter 50 is such that the gate 84 is inhibited when the flip-flop 48 is in its "0" state, and this inhibit is removed when the latter is set to its "1" state. Accordingly, when the flip-flop 48 is set to its "1" state, indicating frame loss, the counter 81 is reset and the inhibit applied to gate 84 is removed. With the removal of this inhibit, the $F_1$ and $F_0$ clock pulse signals are delivered to the counter 81 via OR gate 85 and gate 84.

The counter 81 attempts to count to a predetermined number (e.g., sixteen) in response to the applied clock pulse signals $F_1$ and $F_0$. The reset terminals of the several counter stages are connected to the output of the Bit Aligner via the gate 82 and differentiator-clipper 83 and hence when an out-of-frame condition exists the intermittently generated search reset signals continually abort the count and reset the counter to zero. When framing is eventually re-established, no search reset signals will be generated and the counter then counts to the chosen number.

When the counter 81 reaches count sixteen, for example, the "16" detect translator 86, which is simply an AND gate connected to appropriate rail leads, delivers a reset signal to the flip-flop 48 and the counter 43. The resetting of this flip-flop once again inhibits the operation of the Bit Aligner; the application of the $F_1$ and $F_0$ clock pulses to counter 81 is inhibited; the counter 81 "sits" at count 16; and normal service is resumed.

The forward-backward counter 43 of FIG. 3 is shown in detail in FIG. 5 of the drawings. The derivation of the count up and count down signals has already been described in detail and hence will not be covered again. Assume now that it is desirable that the counter 43 count to six before delivering an output signal. For the binary counter 90 of FIG. 5 to count to six, three stages are required, each of which is designated with a designation in parenthesis indicating the decimal equivalent of the binary stage. Each of the three stages of the counter 90 is arranged to supply two rail logic output signals. That is, each stage has a (0) and a (1) output lead.

The count up pulse signals are applied to the advance lead of the binary counter 90 to advance the count therein in a conventional manner. When the counter eventually counts to six, the (1) output leads of the stages designated (2) and (4) and the (0) output lead of stage (1) will be energized. The AND gate 91 is connected to each of these energized leads and hence it will be enabled when, and only when, the binary counter reaches count six.

The count down signals serve to periodically reset the counter 90 to the next lower count. This one count reset operation is accomplished by means of the count down translator 92. For purposes of explanation, assume the counter 90 is at count four when a count down signal arrives. The AND gate 93 is connected to the (0) output leads of the counter stages designated (1) and (2), and to the (1) output lead of stage (4). The gate 93 is therefore partially enabled. The count down signal lead is also connected to the input of gate 93 and hence when a count down signal appears the gate 93 is completely enabled and it delivers an energizing signal to the set terminals of stages (1) and (2) and to the reset terminal of stage (4). With stages (1) and (2) set and stage (4) reset, the counter now registers count three and hence has been counted down one digit. In similar fashion the counter can be made to count down to the next lower count each time a count down signal is applied thereto. No provision to made in translator 92 for the zero count condition and hence of the counter counts down to zero it just remains there until a count up signal is received.

As indicated heretofore the $F_0$ bit itself is not significant, its primary function being to speed up the reframing process. This framing bit can be eliminated from the message bit stream and framing and reframing can be carried out with only $F_1$ bit. In this case, the gates 41 and 51 would be omitted, but the circuit would function in essentially the same fashion as heretofore described. Similarly, the invention is in no way limited to any specific type of unique framing bit pattern, all that is necessary in this regard is that a recognizable framing bit pattern be utilized. Depending upon the unique framing sequence used, minor changes in the Bit Aligner and Frame Loss Detector, for example, may be called for, but such changes are well within the scope of one skilled in the art. It is to be understood therefore that the above-described arrangement is merely illustrative of the application of the principles of the present invention and numerous modifications thereof may be devised by those skilled in the art without departing from the spirit and scope of the invention.

What is claimed is:

1. In a synchronous pulse communication system which includes receiver apparatus for reconstituting a message from code groups of pulses of an incoming pulse train, at least one pulse period of each frame of said train being assigned to a framing digit which is distinguishable from other digits of the train by virtue of its unique recurrent pattern, which apparatus comprises clock pulse generator means operative in response to the received pulse train to normally generate a synchronous clock pulse signal for each frame of said incoming pulse train, means for comparing the timing of the recurring clock pulse signals with respect to the received framing digits, and means operative in response to a loss of synchronism between said clock pulse signals and said received framing digits to advance the relative phase of said clock pulse signals a predetermined number of pulse periods and to thereafter intermittently retard said phase one pulse period at a time until said synchronism is obtained.

2. In a pulse communication system in which a framing bit is inserted in the same relative time slot in successive frames of a message bit stream for framing purposes, the recurring framing bits forming a unique recognizable pattern, receiver apparatus comprising clock pulse generator means operative in response to the received message bit stream to normally generate a synchronous clock pulse signal for each frame of said received bit stream, means for comparing the timing of the recurring clock pulse signals with respect to the received framing bits, and means operative in response to a lack of synchronism between said clock pulse signals and said received framing bits to advance the relative phase of said clock pulse signals a predetermined number of time slot periods and to thereafter intermittently retard said phase one time slot period at a time until said synchronism is obtained.

3. A pulse communication system comprising receiver apparatus for reconstituting a message from code groups of pulses of an incoming pulse train, at least one pulse position of each frame of said train being assigned to a marker pulse which is distinguishable from other pulses of the train by virtue of its regular recurrence rate, said apparatus including means for deriving from the incoming train a sequence of pulses at the basic pulse transmission rate of said train, counter means, means for applying the pulses of said derived sequence to said counter means to normally advance the same in a step-by-step fashion cyclically and in synchronism with the transmitted frames, means for deriving from said counter means a clock pulse signal each time said counter means recycles, means for comparing the timing of the recurring clock pulse signals with respect to the received marker pulses, and control means coupled to the comparison means and operative in response to a loss of synchronism between said clock pulse signals and said marker pulses to first advance the count of said counter means a given number of pulse periods and thereafter to intermittently retard said count one pulse period at a time until synchronism is obtained.

4. In a synchronous pulse communication system which includes receiver means for reconstituting a message from code groups of pulses of an incoming pulse train, at least one pulse period of each frame of said train being assigned to a framing digit which is distinguishable from other digits of the train by virtue of its unique recurrent pattern, which receiver means comprises clock pulse generator means operative in response to the received pulse train to normally generate at least one synchronous clock pulse signal for each frame of said incoming pulse train, means for comparing the timing of the recurring clock pulse signals with respect to the received framing digits, means operative in response to a loss of synchronism between said clock pulse signals and said received framing digits to advance the relative phase of said clock pulse signals a predetermined number of pulse periods, means operative subsequent to said advance to intermittently retard said phase one pulse period at a time, and means for terminating the aforementioned retardation upon the reestablishment of framing.

5. The combination as defined in claim 4 including means for inhibiting the aforementioned phase advance and retardation until loss-of-frame has occurred over a predetermined minimum number of cycles.

6. A pulse communication system comprising receiver apparatus for reconstituting a message from code groups of pulses of an incoming pulse train, at least one pulse position of each frame of said train being assigned to a framing digit which is distinguishable from other digits of the train by virtue of its unique regular recurrence pattern, said apparatus comprising means for deriving from the incoming train a sequence of pulses at the basic pulse transmission rate of said train, a pulse counter, means for applying the pulses of said derived sequence to said counter to normally advance the count therein in a step-by-step fashion cyclically and in synchronism with the received frames, means for deriving from said counter a clock pulse signal each time the counter reaches a given count, means for comparing the timing of the recurring clock pulse signals with respect to received framing digits, means operative in response to a loss of synchronization between said clock pulse signals and said received framing digits to jump the count in said counter to a predetermined number and thereby advance the relative phase of said clock pulse signals, means operative subsequent to said jump-count to intermittently inhibit one pulse at a time the transmission to the counter of the pulses of said derived sequence to thereby intermittently retard the relative phase of said clock pulse signals, and means for terminating the aforementioned intermittent inhibit upon the recovery of framing.

7. A pulse communication system as defined in claim 6 including means for inhibiting the aforementioned phase advance and retardation until loss-of-frame has occurred over a predetermined minimum number of cycles.

8. A pulse communication system as defined in claim 6 including means for preventing the recurrence of the aforementioned jump-count during any given frame search.

No references cited.